United States Patent
Kwok et al.

[11] Patent Number: 6,027,759
[45] Date of Patent: Feb. 22, 2000

[54] METHOD AND APPARATUS FOR EVALUATING A PAINT FILTER

[76] Inventors: Kui-Chiu Kwok, 655 Woodhaven Dr., Mundelein, Ill. 60060; Ali Reza Vatine, 221 W. Rustic Lodge, Minneapolis, Minn. 55409

[21] Appl. No.: 08/927,454

[22] Filed: Sep. 11, 1997

[51] Int. Cl.⁷ ...................................................... B05D 1/02
[52] U.S. Cl. ............................... 427/8; 427/421; 73/865.9
[58] Field of Search ........................ 427/8, 421; 118/326, 118/DIG. 7; 454/50, 51; 73/865.9, 33, 40; 95/8, 19, 268; 96/413, 414, 418

[56] References Cited

U.S. PATENT DOCUMENTS

| | | | |
|---|---|---|---|
| 5,356,334 | 10/1994 | Gray | 454/51 |
| 5,561,515 | 10/1996 | Hairston et al. | 356/28 |
| 5,743,958 | 4/1998 | Shutic | 118/308 |

OTHER PUBLICATIONS

Method 319: Determination of Filtration Efficiency for Paint Overspray Arrestors, 61 Federal Register 55862, pp. 55862–55869, Oct. 26, 1996.

*Primary Examiner*—Shrive Beck
*Assistant Examiner*—Jennifer Calcagni
*Attorney, Agent, or Firm*—Nawrocki, Rooney & Sivertson, P.A.

[57] ABSTRACT

A method and apparatus for evaluating a paint filter. The apparatus includes a duct, air supply, spray gun, target, filter holder and particle sensing device. The spray gun and target are disposed within the duct to simulate actual paint spraying conditions, including production of overspray. The filter holder maintains a test filter downstream of the target such that overspray interacts with the test filter. The particle sampling device is associated with the filter holder and is configured to sense and provide information indicative of paint filter efficiency and preferably includes a time-of-flight particle measurement instrument. During use, the spray gun sprays paint particles at the target. Overspray from the target interacts with the test filter. The particle sampling device senses data upstream and downstream of the filter, from which a filter evaluation is made.

4 Claims, 2 Drawing Sheets

METHOD AND APPARATUS FOR EVALUATING A PAINT FILTER

BACKGROUND OF THE INVENTION

The present invention relates to a method and apparatus for evaluating a paint filter. More particularly, it relates to a method and apparatus for evaluating the fractional efficiency of a paint filter under real world spray painting conditions.

A well-known manufacturing approach for applying paint onto a surface of an object is spray painting. This technique can be used to coat a wide variety of objects, ranging from large automobile bodies to miniature plastic components, with paint. Depending upon the particular application, a number of different paints can be used, including water-based, solvent-based, acrylic-based, metallic paints, etc., to name but a few.

A typical spray painting operation takes place within an enclosed spray booth. The object to be painted, as well as a paint spray gun, are located within the spray booth. The spray gun receives paint and atomizing air to break up the paint into small particles. These particles, in turn, are directed toward the object to be coated. To clean up the unused paint particles, the spray booth normally includes an exhaust fan positioned behind, or downstream of, the object to be coated, and draws air from inside the spray booth.

During use, paint particles are directed at and adhere to the object surface. It is understood that not all paint particles will attach to the object. Those paint particles that do not deposit on the object are referred to as "overspray". These overspray particles will either deposit on the spray booth walls or continue downstream toward the exhaust fan. To prevent overspray from exiting the spray booth via the exhaust fan, a paint filter is provided upstream of the exhaust fan. Thus, the paint filter forms a vital component of the spray painting process as it prevents undesirable and potentially hazardous release of paint particles into the surrounding environment.

Paint filters are designed to collect airborne paint particles in the form of overspray. Due to diverse paint formulations and applications, a number of different paint filters are available. As is known in the spray painting and paint filtration industries, paint particles are resinous and may include pigments, additives and solvent. For metallic paints, metallic flakes are encapsulated within the particles. Even further, to control emissions of volatile organic compounds, water-based and high-solids paints have been developed. Therefore, depending upon the particular paint application, one particular paint filter may be more or less useful than another.

The performance rating of a paint filter is normally measured by parameters such as pressure drop across the filter, average filtration efficiency, fractional efficiency and loading capacity. To accurately evaluate the filtration performance of a paint filter based upon any of these parameters, a carefully designed testing method must be used. One testing standard, referred to as ASHRAE 52.1, has been prescribed to measure dust spot efficiency, average filtration and loading capacity for air filters. Further, an ASHRAE 52.2 standard has been proposed for evaluating air filters in terms of fractional efficiency. Even more recently, the Environmental Protection Agency has released a proposed testing method, referred to as Method 319, for measuring fractional efficiency of paint filters. Method 319 is similar to ASHRAE 52.2. With each of these testing methods, and others that have been proposed and/or implemented, a paint filter is "tested" by directly exposing the paint filter to particles of a predetermined compound. These compounds include potassium chloride (KCl), sodium chloride (NaCl), oleic acid or dust particles as the challenging particles. While these standard testing approaches have been accepted by the industry, they do not provide a suitable evaluation of paint filter performance for at least two reasons.

First, it is well accepted that paint particle adhesion to a paint filter media varies widely from paint to paint. When the paint particles are drawn through the paint filter, the collection efficiency of the paint filter depends upon paint particle size and adhesion between the particles and the paint filter. Therefore, any test utilizing a challenging compound or particle other than the actual paint used with the paint filter does not provide a true indication of that filter's usefulness for a particular application. For example, a fast drying paint normally uses a fast drying solvent with resulting paint particles being drier and less sticky. A paint filter test utilizing, for example, potassium chloride instead of the fast drying paint will not provide a viable evaluation of the paint filter for the desired paint application. In other words, the standard test will show the paint filter as being more or less efficient than it might otherwise be when used to collect fast drying paint particles.

A second drawback presented by preferred testing methods is a failure to test a paint filter's ability to retain overspray paint particles. As previously described, overspray is paint particles which have deflected off of, or otherwise not adhered to, the object being coated. Through testing, it has been shown that overspray particle diameter is much less than that originally produced by the spray gun. FIGS. 1A–1C provide a graphical representation of paint particle size (solvent based white acrylic enamel) at three different air-to-paint ratios (A/P). As is shown, the paint particle size at the object (or target, FIG. 1A) is much higher than the overspray (or exhaust, FIG. 1C). The standardized testing techniques fail to account for this change in particle size. In other words, standardized testing techniques unrealistically evaluate a paint filter by subjecting the paint filter to spray directly from the spray gun. During use, the paint filter will be required to collect overspray particles, not direct spray. Because the particles associated with the direct spray are larger and more easily retained, a skewed evaluation may result.

Therefore, in view of the above problems associated with accepted filtration testing techniques, a substantial need exists for a method and apparatus for accurately evaluating paint filter efficiency under conditions as close as possible to actual conditions.

SUMMARY OF THE INVENTION

The present invention provides a method and apparatus for evaluating a paint filter. In the preferred embodiment, the apparatus and method are based upon evaluating paint filter performance under expected operating conditions.

The paint filter evaluation apparatus of the present invention comprises a test duct, an air source, a spray gun, a target, a filter holder, a particle sampling device, and a final filter. The air source is connected to an inlet end of the duct. The spray gun and target are disposed within the test duct proximal the inlet end such that the target is downstream of the spray gun. The target is configured to retain at least a portion of paint particles generated by the spray gun and to allow a remaining portion of the particles to flow toward an exhaust end of the duct as overspray. The filter holder is configured to maintain a paint filter to be evaluated in a position downstream of the target so that at least a portion of the overspray interacts with the paint filter. The particle sampling device is associated with the filter holder and is configured to provide information indicative of paint filter efficiency. Finally, the final filter removes all paint particles from the air before exhausting the air into the environment.

A preferred method of using the above-described apparatus includes positioning a paint filter to be evaluated within the filter holder. A spray painting process is then simulated by supplying paint and atomizing air to the spray gun. The spray gun, in turn, atomizes the paint into particles which are then driven toward the target. At least a portion of these paint particles will deflect from the target in the form of overspray. The filter holder locates the paint filter to be evaluated downstream of the target such that at least a portion of the overspray interacts with the paint filter. The particle sampling device, in turn, senses at least one parameter indicative of fractional efficiency. In one preferred embodiment, the particle sampling device senses at least one parameter both upstream and downstream of the paint filter. These values are compared to determine paint filter efficiency. In another preferred embodiment, the particle sensing device includes a time-of-flight instrument which analyzes paint particle time-of-flight. The time-of-flight information is correlated with upstream and downstream parameter(s) to determine paint filter efficiency at a particular paint particle size.

DETAILED DESCRIPTION OF THE INVENTION

Figure 1A:
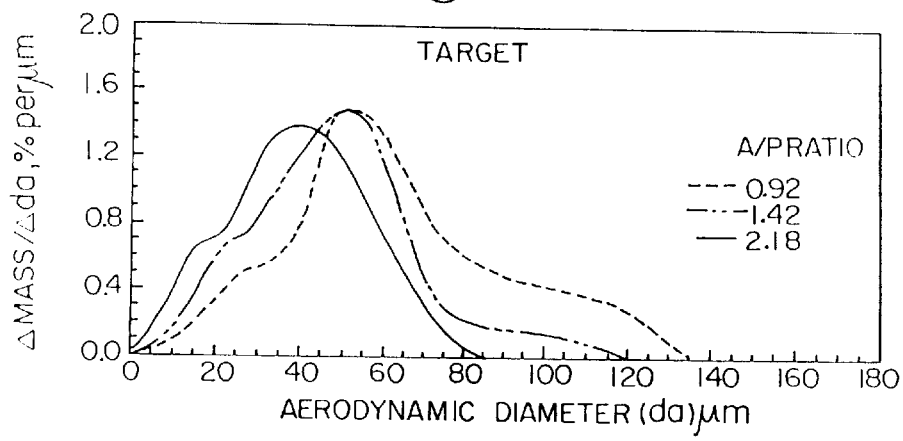
FIG. 1A, 1B, 1C are graphical representations of paint particle sizes at different locations within a spray paint booth.
Figure 1B:
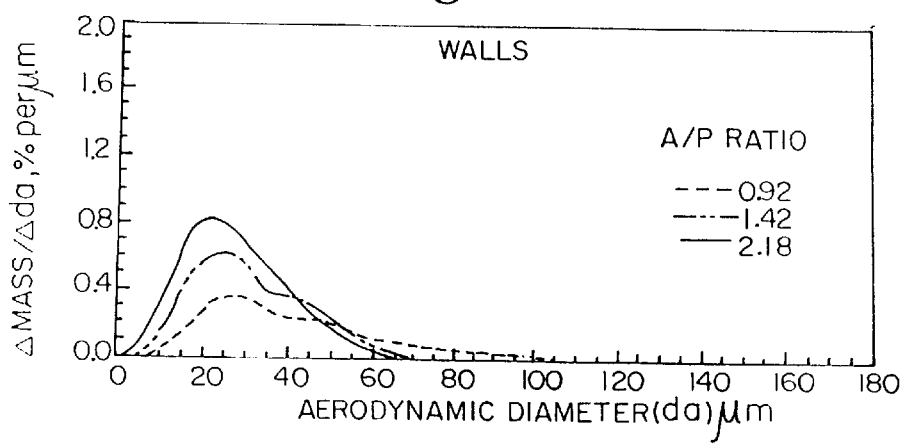
Figure 1C:
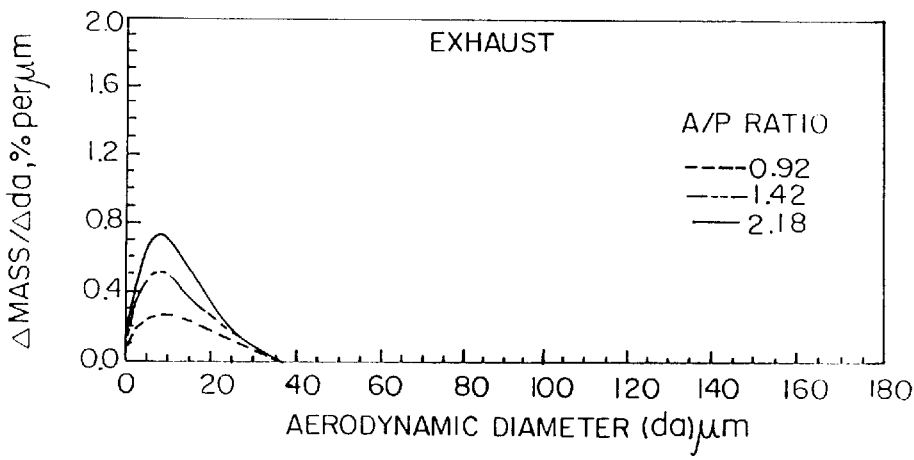
Figure 2:
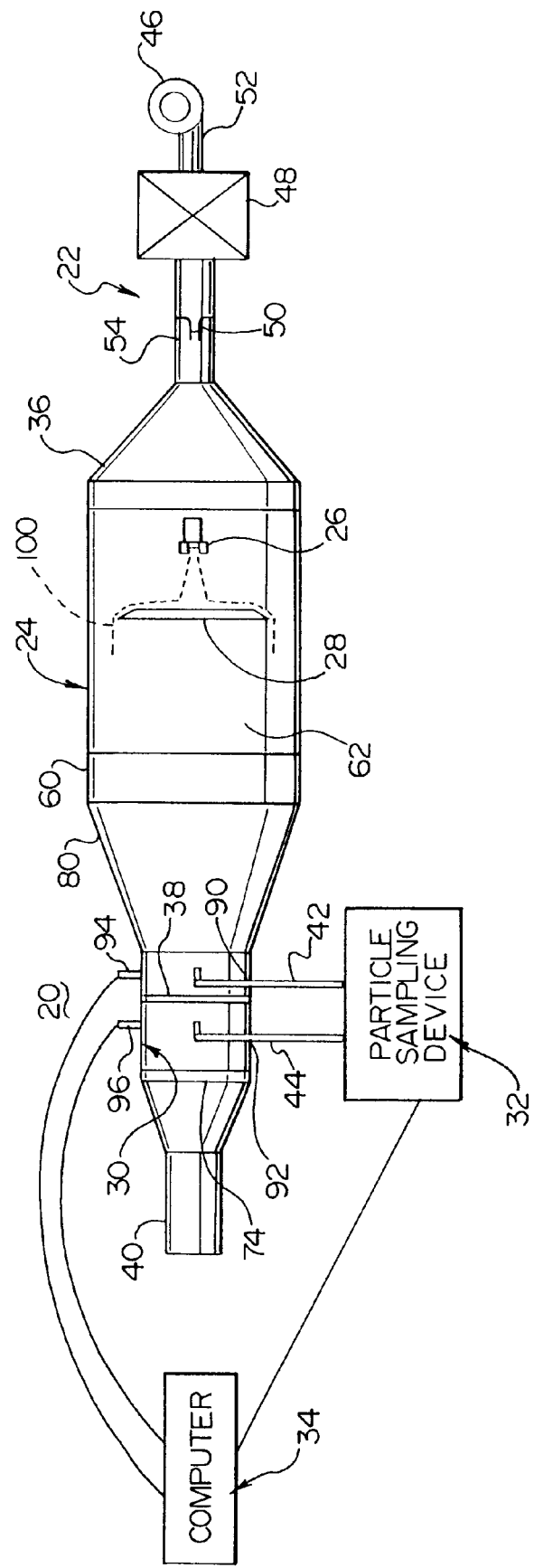
FIG. 2 is a cross-sectional view of filter evaluating apparatus in accordance with the present invention, with portions shown in block form.

A preferred embodiment of a paint filter evaluating apparatus 20 is shown in FIG. 2. The apparatus 20 includes an air source 22, a test duct 24, a spray gun 26 (shown partially in FIG. 2), a target 28, a filter holder 30, a particle sampling device 32 and a computer 34. The air source 22 is fluidly connected to an inlet end 36 of the test duct 24. As described in greater detail below, the spray gun 26 and the target 28 are disposed within the test duct 24. The filter holder 30 maintains a test filter 38 near an exhaust end 40 of the test duct 24. Finally, the particle sampling device 32 includes an upstream probe 42 and a downstream probe 44 positioned relative to the filter holder 30 as shown in FIG. 2.

Air Source 22

The air source 22 is configured to provide pressurized, clean air flow to the test duct 24 and preferably includes a blower 46, an entrance filter 48 and an air flow meter 50. The blower 46, shown partially in FIG. 2, includes an exit tubing 52 connected to the entrance filter 48. The entrance filter 48, in turn, is connected to the test duct 24 by a supply conduit 54 within which the air flow meter 50 is disposed.

The blower 46 directs pressurized ambient air via the exit tubing 52 to the entrance filter 48. The blower 46 can be of a type known in the art sufficient to generate pressurized air flow within the range of 0–3,000 CF/min.

The entrance filter 48 is configured to receive pressurized air from the exit tubing 52 of the blower 46. The entrance filter 48 is preferably a HEPA filter. Alternatively, other types of filters are acceptable so long as the entrance filter 48 removes most particulate contaminants from the ambient air supplied by the blower 46. The entrance filter 48 is in fluid communication with the supply conduit 54 on a side opposite that of the blower 46. Thus, pressurized air from the blower 46 passes through the entrance filter 48 and into the supply conduit 54.

The supply conduit 54 is configured to direct air from the blower 46 to the test duct 24. In this regard, the supply conduit 54 is preferably made of stainless steel or other solid material able to retain its form under pressure.

Finally, the preferred apparatus 20 incorporates the air flow meter 50 within the supply conduit 54. The air flow meter 50 is configured to sense a parameter related to flow of air through the supply conduit 54 and can assume a wide variety of forms known in the art. For example, the air flow meter 50 can be a venturi meter or other differential measurement system. Alternatively, the air flow meter 38 can be a positive displacement apparatus. Regardless of exact form, the air flow meter 50 is used to measure the air flow rate downstream of the entrance filter 48 so that the blower 46 can be regulated to produce a desired air flow rate.

While the air source 22 has been described as preferably including the blower 46, the entrance filter 48 and the air flow meter 50, other forms are acceptable. For example, the entrance filter 48 and the air flow meter 50 can be eliminated. Even further, the blower 46 can be replaced by a vacuum or fan connected to the exhaust end 40 of the test duct 24 for drawing air into the inlet end 36 of the test duct 24.

Test duct 24, Spray Gun 26 and Tarqet 28

The test duct 24 includes a cylindrical wall 60 that defines the inlet end 36, the exhaust end 40 and an interior space 62. In the preferred embodiment, the cylindrical wall 60 is made of stainless steel which tapers at opposite ends to form the inlet and exhaust ends 36, 40. However, other strong materials, such as aluminum or plastic, may be used.

The test duct 24 is configured to receive and direct forced air from the air supply 22 at the inlet end 36 to the exhaust end 40. In this regard, the test duct 24 preferably maintains a final filter 74 near the exhaust end 40. The final filter 74 is preferably a high efficiency filter for collecting paint particles not otherwise captured by the test filter 38. Thus, the final filter 74 is positioned downstream of the test filter 38. Alternatively, as described in greater detail below, the final filter 74 may be included as a portion of the filter holder 30.

The spray gun 26, shown partially in FIG. 2, is of a type commonly known in the art and is preferably maintained within the interior 62 of the test duct 24 proximal the inlet end 36. The spray gun 26 is fluidly connected to an atomization air supply (not shown) and a paint pot (not shown). With this arrangement, the spray gun 26 projects atomizing air into the paint flow and breaks up the paint into particles.

The target 28 is preferably a plate-like object positioned within the interior 62 of the test duct 24 downstream of the spray gun 26. The target 28 can be made from a wide variety of materials designed to retain paint particles. For example, the target 28 may be made of metal or plastic. Even further, the target 28 can be coated with a material configured to retain paint particles. The target 28 is centrally maintained within the test duct 24 at an appropriate spraying distance from the spray gun 26. In the preferred embodiment, the spraying distance is 8"–14".

Importantly, while the target 28 may assume diverse sizes and/or shapes, the target 28 must have an outer diameter smaller than an inner diameter of the test duct 24 such that paint overspray can pass between an outer edge of the target 28 and the wall 60 of the test duct 24. To this end, the target 28 is preferably to have chamfered edges as shown in FIG. 2 to facilitate the flow of overspray around the target 28.

Filter Holder 30

The filter holder 30 is configured to maintain the test filter 38 downstream of the target 28 near the exhaust end 40 of the test duct 24. In one preferred embodiment, the filter holder 30 is a metal frame integrally formed with the test duct 24. The filter holder 30 provides user access to the test filter 38 for simple insertion and removal. Alternatively, the filter holder 30 may be a component separate from the test duct 24. With this alternative configuration, the exhaust end 40 and the final filter 74 shown in FIG. 2 form a part of the filter holder 30. The filter holder 30, including the exhaust end 40 shown in FIG. 2, is then selectively mounted to a shoulder 82 of the test duct 24.

Regardless of the exact form, the filter holder 30 forms a seal with the test duct 24. Further, the filter holder 30 is sized to maintain the test filter 38 such that overspray particles cannot pass about an outer circumference of the test filter 38. In other words, the filter holder 30 is configured to maintain the test filter 38 such that virtually all overspray paint particles directed toward the exhaust end 40 have an opportunity to interact with the test filter 38. Any paint particles not retained by the test filter 38 are directed by the filter holder 30 to the final filter 74.

In one preferred embodiment, the filter holder 30 includes probe openings 90 and 92 for receiving the upstream and downstream probes 42 and 44, respectively. The probe openings 90 and 92 are preferably sized to seal about the upstream and downstream probes 42 and 44 such that paint particles cannot escape through the probe openings 90, 92. Further, the filter holder 30 preferably includes an upstream pressure tap 94 and a downstream pressure tap 96, each of which are connected to a pressure gauge or other pressure sensing device (not shown). The upstream pressure tap 94 is preferably positioned along the filter holder 30 upstream of the test filter 38. Conversely, the downstream pressure tap 96 is positioned downstream of the test filter 38. As described in greater detail below, the upstream and downstream pressure taps 94, 96 provide information related to efficiency of the test filter 38 and test performance.

Particle Sampling Device 32 and Computer 34

The particle sampling device 32 is preferably configured to analyze air samples taken from the upstream probe 42 and the downstream probe 44. In the preferred embodiment, the particle sampling device 32 is a laser time-of-flight particle measurement instrument. Basically, the time-of-flight particle measurement instrument uses a vacuum pump (not shown) to draw an air sample through a nozzle (not shown), provided at the upstream probe 42 and/or the downstream probe 44, at choked flow. Two laser beams are placed below the nozzle to form two measurement lines. Along with the two laser beams are two photo-multipliers which are used to detect any light scattering from the sampled particles. As particles flow down and are intercepted by the laser beams, the scattered light will trigger the photo-multiplier detectors. Then, a counter will count and a clock will measure the time-of-flight of paint particles as they traverse the distance between the two laser beams. The time-of-flight measurement instrument measures particle size which depends on the inertial behavior of the particle and is usually referred to as "aerodynamic diameter". This is defined as the diameter of a unit density sphere which has the same settling velocity as the particle in question.

Alternatively, the particle sampling device 32 can assume a number of different measurement modes, such as isokinetic measurement and physical diameter. Even further, a non-invasive optical analyzer can be used. Regardless of exact form, the particle sampling device 32 senses a parameter related to paint particle concentration upstream and downstream of the test filter 38. Where the particle sampling device 32 includes a time-of-flight measurement instrument, time-of-flight and material density information can be used to calculate aerodynamic particle size in addition to paint particle concentration. Notably, a time-of-flight instrument for paint particle measurement is preferred in that the lenses associated with the instrument will not be contaminated by the paint particles and cleaning of the nozzle is relatively straightforward.

Information from the particle sampling device 32 is signalled to the computer 34. Additionally, the computer 34 preferably receives test information from the upstream and downstream pressure taps 94, 96. In preferred embodiments, the computer 34 is a microprocessor-based computer including associated memory and associated input-output circuitry. Moreover, in other embodiments, the computer 34 can be replaced with a comparator, a programmable logic control (PLC) or other controller or equivalent circuitry.

The computer 34 is configured to receive and compare particle-related data from upstream and downstream of the test filter 38 to determine filter efficiency. In a preferred embodiment, the computer 34 is further configured to calculate paint particle diameter so that the test filter 38 is rated for a particular paint particle size. Filter efficiency, along with other data, can be provided at an output (not shown) associated with the computer 34 in the form of a display screen, paper printout, or electronic file.

Method of Use

The method of using the apparatus for evaluating filter performance 20 shown in FIG. 2 is generally as follows. The test duct 24 is arranged as shown in FIG. 2. More particularly, the spray gun 26 and the target 28 are disposed within the test duct 24. Similarly, the test filter 38 is placed within the filter holder 30, which in turn is sealed to the test duct 24. The air source 22 is used to provide clean air flow to the test duct 24 via the blower 46 and the entrance filter 48. In this regard, the air flow meter 50 provides an indication of air flow rate. Biased upon this information, the blower 46 can be adjusted so that a desired air flow rate is supplied to the test duct 24. Notably, the computer 34 can be used to provide the air supply analysis and control.

The spray gun 26 is then activated, directing paint particles (represented by dashed lines 100 in FIG. 2) toward the target 28. The paint particles that do not: deposit on the target 28 form overspray and are carried around the target 28 via air flow from the air source 22. A portion of the overspray may deposit on the wall 60 of the test duct 24. The remaining portion of overspray will continue downstream and interact with the test filter 38. Following the test filter 38, the air, which may still contain paint particles, will pass through the final filter 74 before being exhausted to the outside environment through the exhaust end 40 of the test duct 24.

During the spraying process, the particle sampling device 32 samples the air flow both upstream and downstream of the test filter 38 and by using two supply devices, one each upstream and downstream at real time. In this regard, the particle sampling device 32 analyzes air samples taken at the upstream probe 44 and the downstream probe 46 for particle concentration levels. In the preferred embodiment, where the particle sampling device 32 includes a time-of-flight particle measurement instrument, the particle sampling device 32 senses a value indicative of time-of-flight information.

The particle sampling device 32 provides a signal representative of the sensed particle-related information to the computer 34. Additionally, in the preferred embodiment, the computer 34 receives information from the upstream pressure tap 94 and the downstream pressure tap 96. Alternatively, the particle sensing device 32 may be connected to the upstream and downstream pressure taps 94, 96 and in turn provide signals representative of upstream and downstream pressure to computer 34. Based upon received information, the computer 34 evaluates the filtration performance of the test filter 38, including the fractional efficiency.

Evaluation of the test filter 38 by the computer 34 can be based upon a number of different values and/or parameters. For example, where the particle sampling device 32 is a time-of-flight instrument, the computer 34 can use the time-of-flight information in conjunction with previously-determined material density to determine aerodynamic particle diameter of paint particles. Additionally, the time-of-flight particle measurement instrument counter will provide information indicative of paint particle concentration and physical diameter. The computer 34 compares particle concentration upstream of the test filter 38 with the particle concentration downstream of the test filter 38 as one approach to determining filter efficiency.

Information received from the upstream pressure tap 94 and the downstream pressure tap 96 can be used by the computer 34 to enhance the evaluation, or even as the sole source for filter evaluation. Even further, with the spray gun 26 deactivated, the test filter 38 can be removed from the filter holder 30 and weighed. This weight information can be entered into the computer 34 and used as part of the evaluation. In the preferred embodiment, where the particle sampling device 32 provides information indicative of aerodynamic particle size, the computer 34 can evaluate and rate test filter efficiency at different particle sizes. The computer 34 presents or otherwise displays filter efficiency information to a user. This information can be in the form of a single rating value, or may be a graphical or tabular representation of the filter's performance. The information may be displayed by the computer 34 via a screen and/or paper printout.

The method and apparatus for evaluating a paint filter of the present invention overcomes the deficiencies presented by standard filter testing techniques. For example, the apparatus of the present invention simulates actual spray-painting conditions. Thus, a filter is evaluated using actual paint as opposed to other substances having or lacking characteristics found with paint. Additionally, the present invention accounts for the fact that a paint filter is normally required to retain overspray particles, instead of larger, direct spray particles from an atomizer. Thus, the evaluation apparatus of the present invention closely simulates a real-world spray painting and filtration process and uses this process for evaluating a paint filter. Finally, a preferred embodiment of the present invention incorporates a time-of-flight particle measurement instrument to provide information indicative of paint particle characteristics. Use of this particle sampling device provides valuable information in a manner allowing for minimal down time between tests.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

For example, a preferred embodiment of the present invention has described the use of a test duct, spray gun and target for simulating a spray painting process. Alternatively, any other apparatus that simulates spray painting may be used. The present invention is based upon the use of a testing apparatus which simulates an actual spray painting process, regardless of exact form.

Further, the preferred embodiment incorporates a computer to evaluate at least one parameter indicative of paint filter efficiency sensed by the particle sensing device. Alternatively, the computer can be omitted and the data produced by the particle sensing device analyzed manually.

What is claimed is:

1. A method of evaluating fractional efficiency of a filter intended to filter particles of paint, the method including:

simulating a spray painting process, including providing a spray gun and producing a spray of a paint, positioning a target downstream of the spray gun, wherein the target is configured to retain at least a portion of paint particles generated from the spray gun, and allow a remaining portion of the particles to flow toward a paint filter placed downstream of the target as overspray, wherein the overspray is comprised of the particles of paint intended to be filtered and the filter is positioned to interact with the overspray;

sensing a first parameter relating to particle concentration or size at a point upstream of the paint filter;

sensing a second parameter relating to particle concentration or size at a point downstream of the paint filter; and correlating the first parameter with the second parameter to determine fractional efficiency of the paint filter.

2. The method of claim 1, wherein simulating a spray painting process includes:

providing a duct having an inlet and an exhaust;

providing an air supply fluidly connected to the duct;

disposing a spray gun relative to the target within the duct such that the target is downstream of the spray gun; and activating the spray gun to spray paint at the target, at least a portion of the paint particles deflecting from the target in the form of overspray.

3. The method of claim 1, wherein sensing a first parameter includes providing a probe upstream of the paint filter.

4. The method of claim 1, wherein sensing a second parameter includes providing a probe downstream of the filter.

* * * * *